United States Patent [19]

Cope et al.

[11] Patent Number: 4,754,699
[45] Date of Patent: Jul. 5, 1988

[54] ENCHILADA SHELL COOKER

[75] Inventors: Jonathan C. Cope; Michael E. Grady; Donald G. Warnock, all of Madera, Calif.

[73] Assignee: Valley Grain Products, Inc., Madera, Calif.

[21] Appl. No.: 42,019

[22] Filed: Apr. 24, 1987

[51] Int. Cl.⁴ ............................................. A47J 37/12
[52] U.S. Cl. ...................................... 99/404; 99/353; 99/428
[58] Field of Search ................ 99/353, 404, 407, 427, 99/443 C, 405, 428, 431

[56] References Cited

U.S. PATENT DOCUMENTS

| | | |
|---|---|---|
| 2,595,684 | 5/1952 | Lyons . |
| 2,780,163 | 2/1957 | Lee . |
| 3,537,389 | 11/1970 | Villarreal . |
| 3,667,372 | 6/1972 | Hilvitz .................................. 99/404 |
| 3,680,474 | 8/1972 | Brown ................................... 99/353 |
| 3,759,165 | 9/1973 | Wallace . |
| 3,766,846 | 10/1973 | Jimenez ................................. 99/353 |
| 3,817,163 | 6/1974 | Kizziar . |
| 3,861,289 | 1/1975 | Baker et al. ........................... 99/404 |
| 3,901,137 | 8/1975 | Jimenez . |
| 3,946,655 | 3/1976 | Schy ..................................... 99/404 |
| 3,948,160 | 4/1976 | Stickle .................................. 99/404 |
| 4,184,418 | 1/1980 | Jimenez ............................. 99/404 X |
| 4,214,517 | 7/1980 | Caldwell ............................... 99/428 |
| 4,510,165 | 4/1985 | Cardis et al. ..................... 99/404 X |
| 4,530,275 | 7/1985 | Stickle et al. ........................ 99/353 |

Primary Examiner—Louis K. Rimrodt
Assistant Examiner—J. L. Olds
Attorney, Agent, or Firm—Harris, Kern, Wallen & Tinsley

[57] ABSTRACT

A food product cooker having a main frame, a cooking oil pan, a plurality of product carriages, and a main drive endless chain for moving the carriages about the main frame to and from the cooking pan. A food product cooker particularly adapted for producing shells for enchiladas from tortillas, with each carriage having a food product holder with a tubular section on which the tortilla is wrapped and a clamp section which holds the wrapped tortilla in place while being moved into, through and out of the cooking oil pan.

21 Claims, 6 Drawing Sheets

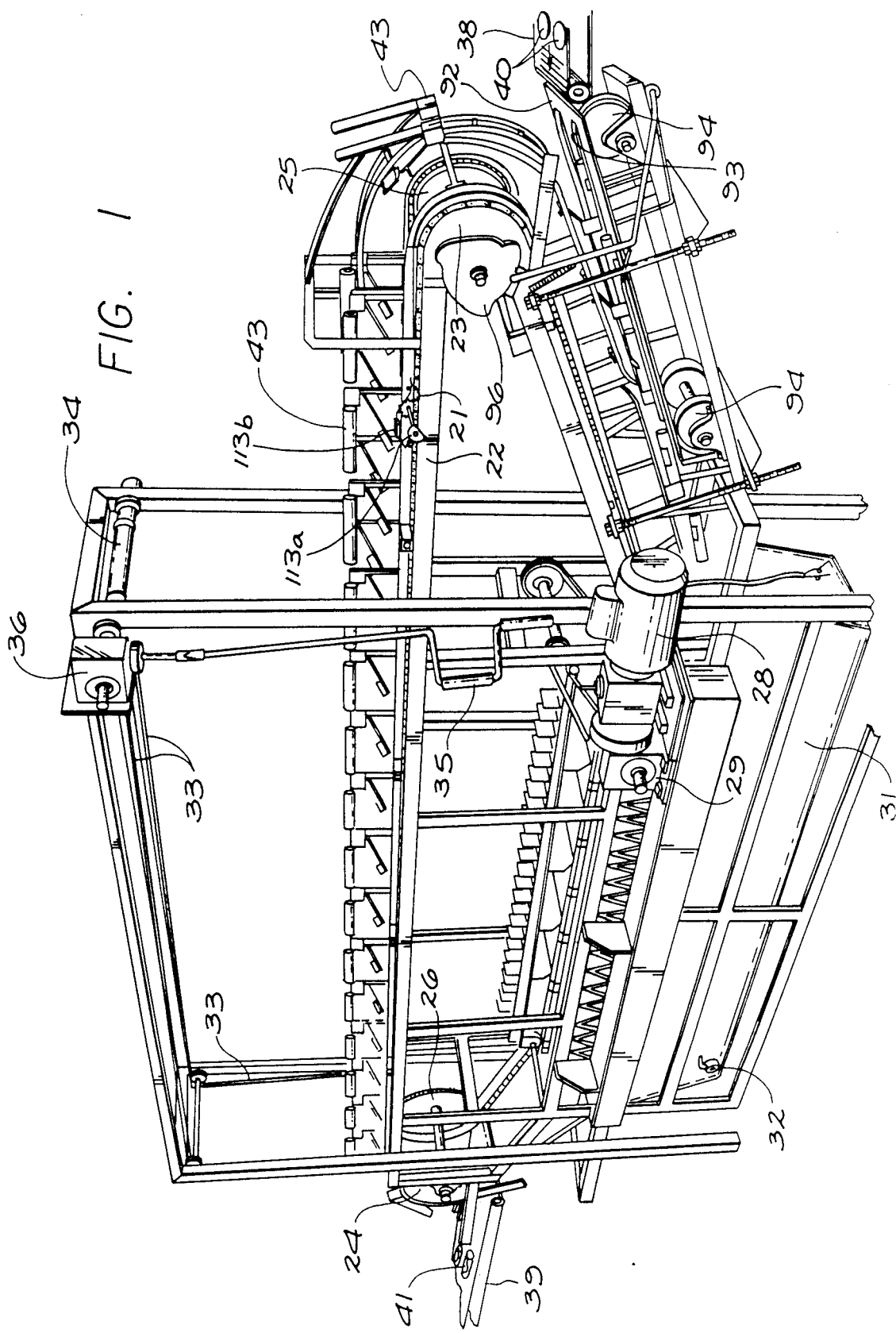

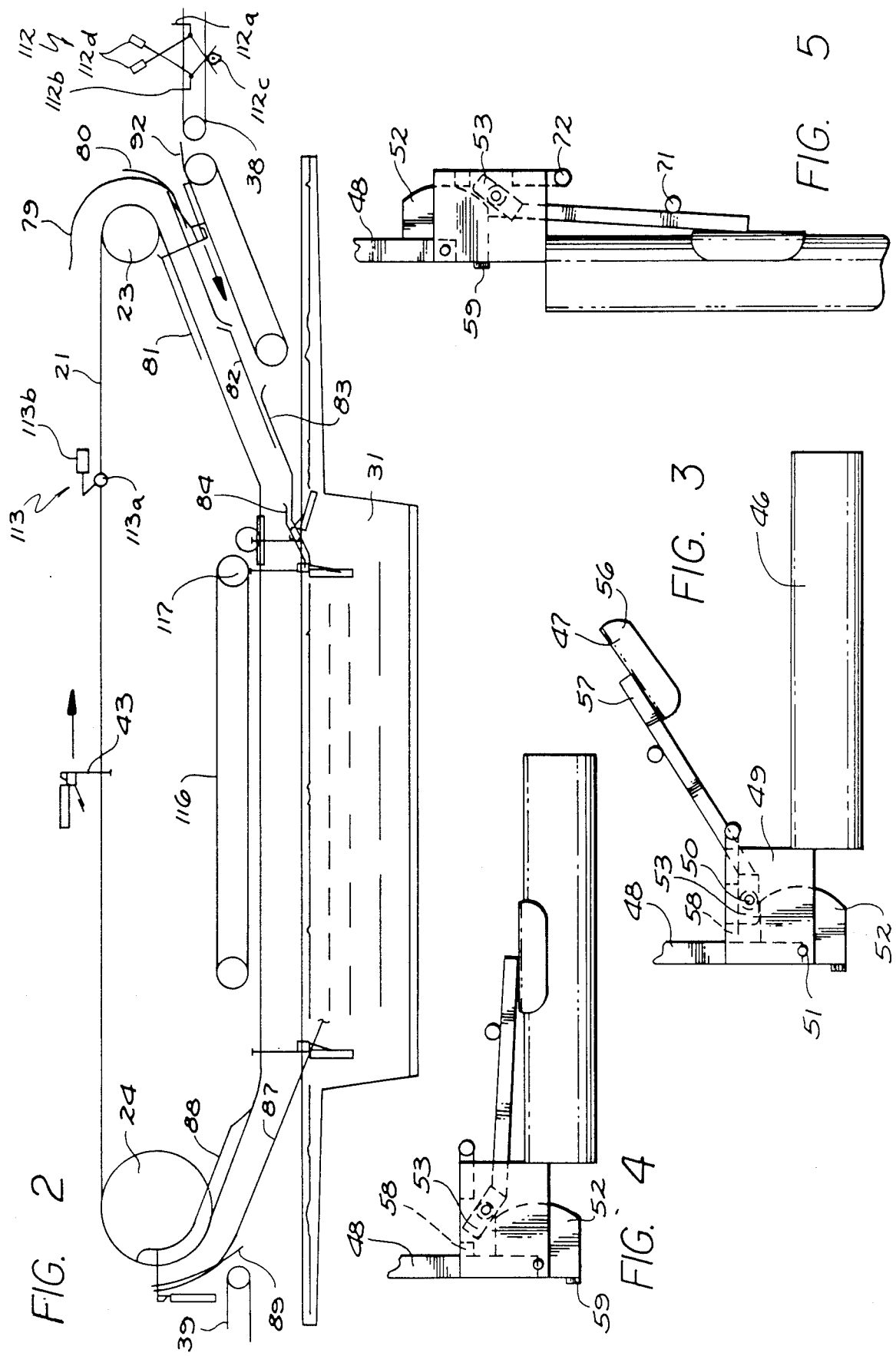

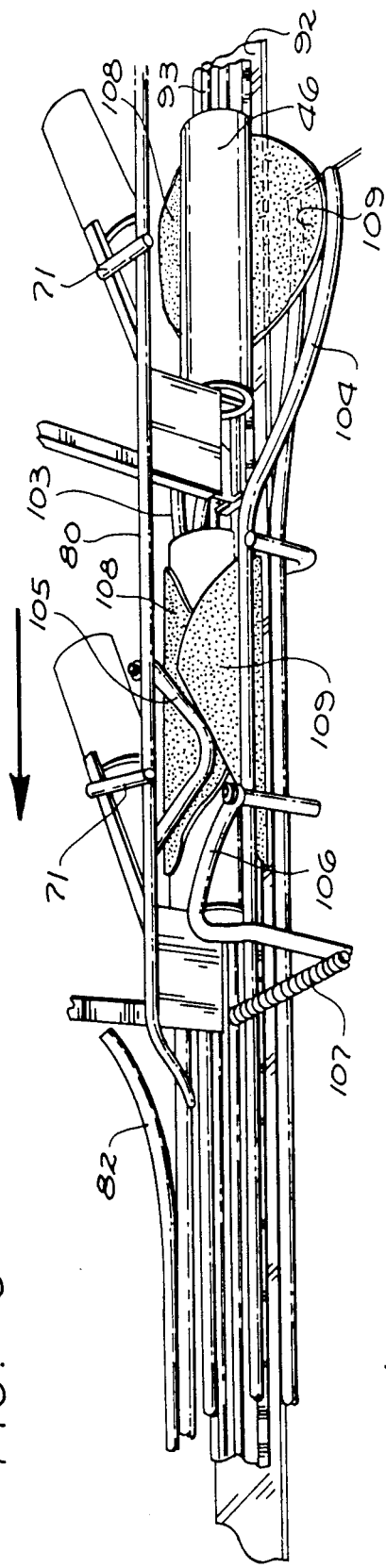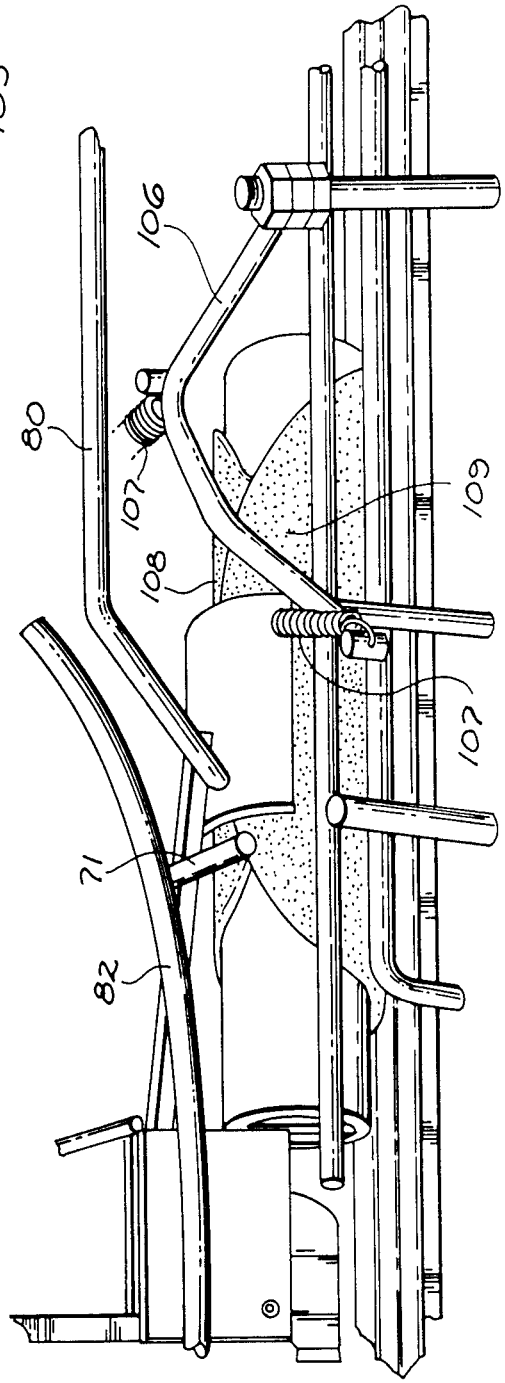
FIG. 9
FIG. 10

4,754,699

1

ENCHILADA SHELL COOKER

BACKGROUND OF THE INVENTION

This invention relates to food product cookers, and in particular to apparatus for cooking shells for enchiladas from tortillas.

A variety of food product cookers have been utilized in the past, and prior art devices which provide for continuous cooking of tortilla type products are shown in U.S. Pat. Nos. 3,948,160 and 4,530,275, and in applicant's copending application U.S. Ser. No. 927,959 filed Nov. 7, 1986.

Enchilada shells have been produced in the past on machinery of this general type. However the prior art machinery has required considerably operator attention and has had relatively low production rates. In the earlier machinery, the product carriages utilized a sleeve or tube on which the tortilla is wrapped and clamped in position. However such machinery required manual feeding of product to the carriage and incorporated a fixed carriage construction with no product holder pivoting or carriage translation. Other disadvantages and problems in the operation of the earlier design include slow operation and low production rates. The carriage configuration and the carriage spacing resulted in a very long machine. The normal ten feet long oil trough was extended to 16 feet, but the output was still very low. The long oil trough, oil heating pan and transport trough resulted in an oil system that was large and bulky. This system required an excessively large volume of oil and the oil tended to break down faster with correspondingly high free fatty acids. This earlier system required an oil pump to circulate the oil, and oil spilling over the trough sides was common. Maintaining adequate heat along the 16 foot trough for frying was a common problem, and the fired enchilada tubes were oiler because they were held in a horizontal position while frying.

It is an object of the present invention to provide a new and improved cooker for enchilada shells and the like, and in particular a cooker which provides an improvement in product quality with a reduction in product rejection rate and an increase in rate of production.

It is another object of the invention to provide such a cooker which automatically provides control of uncooked product feed including synchronization of product feed with cooker operation and with product carriage drive. A particular object is to provide such a feed configuration which does not require manual assistance in loading or in unloading.

It is a further object of the invention to provide a new and improved product carriage and control for the motions of the product carriage components, including the motion of holder sections between open and closed conditions, the positioning of the holder relative to the carriage arm in normal and aligned positions, and the translation of the carriage with respect to the drive chain.

These and other objects, advantages, features and results will more fully appear in the course of the following description.

SUMMARY OF THE INVENTION

A cooker for food products, particularly shells for enchiladas, the cooker having a main frame, a cooking oil pan, a plurality of product carriages, and a main drive endless chain for moving the carriages about the main frame to and from the pan. Each of the carriages includes a food product holder having a tubular section and a clamp section for holding the food product therebetween while moving into, through and out of the cooking pan. Each carriage has a holder pivotally supported on an arm, with the holder having a tubular section and a clamp section, with a flat tortilla being wrapped onto the tubular section and with the clamp section being pivotable between open and closed conditions. In the preferred embodiment, the carriage support arm is coupled to the drive chain by a slide connection permitting the holder to move toward and away from the drive chain during loading and unloading. A cam and cam follower are incorporated in the carriage for limiting movement of holder sections relative to each other and for limiting movement of the holder relative to the support arm. Guide rails are incorporated in the main frame and rail followers are incorporated in the carriages for control of opening and closing of holder sections, control of holder position and control of carriage position during the operating cycle.

BRIEF DESCRIPTION OF THE DRAWINGS

FIG. 1 is a perspective view of an enchilada shell cooker from the loading end, incorporating the presently preferred embodiment of the invention;

FIG. 2 is a diagramatic side view of the cooker of FIG. 1 illustrating the positions of the food product carriages and holder sections during the cooking cycle;

FIG. 3 is a side view of a carriage with the holder in the first position and the holder sections in the open condition;

FIG. 4 is a view similar to that of FIG. 3 with the holder sections in the closed condition;

FIG. 5 is a view similar to that of FIG. 4 with the holder in the second position;

FIGS. 9 and 10 are views similar to those of 7 and 8 showing the tortilla wrapping and clamping operation;

DESCRIPTION OF THE PREFERRED EMBODIMENT

Figure 6:
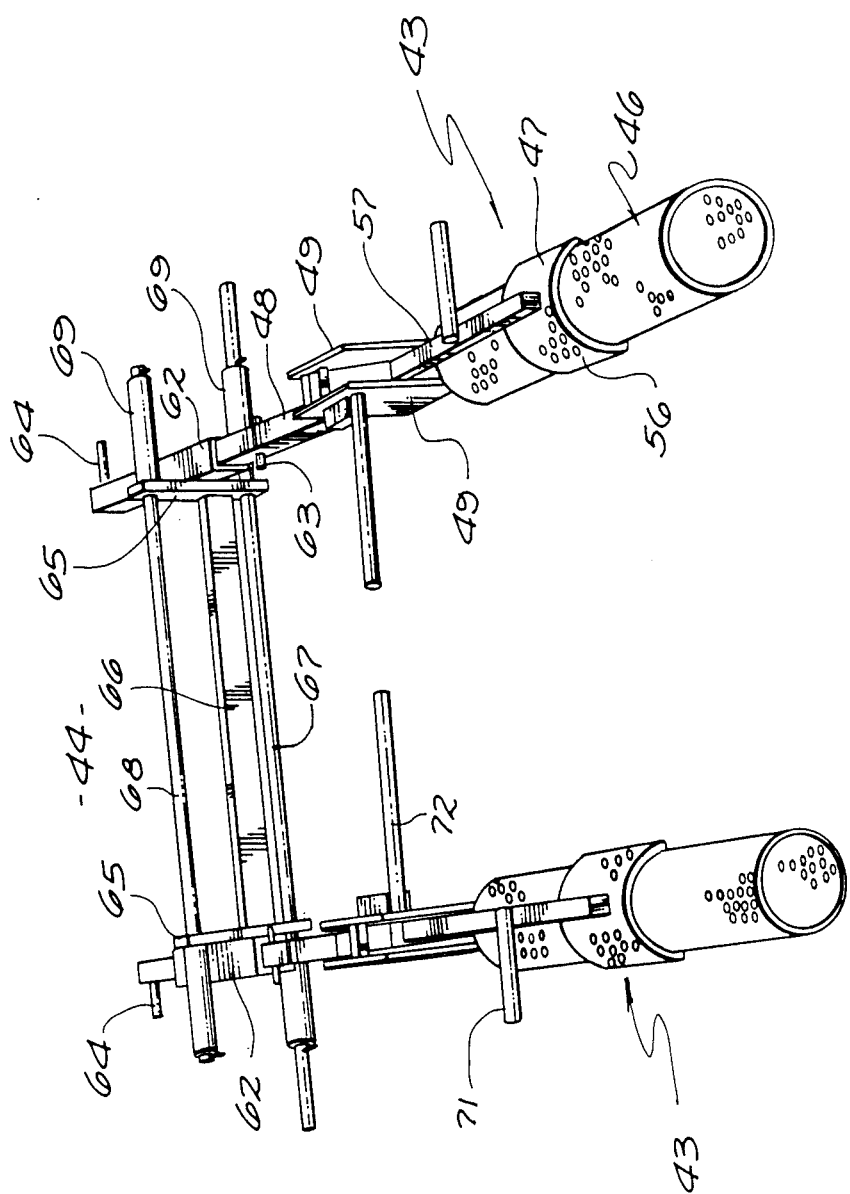
FIG. 6 is a perspective view of a pair of carriages.
Figure 7:
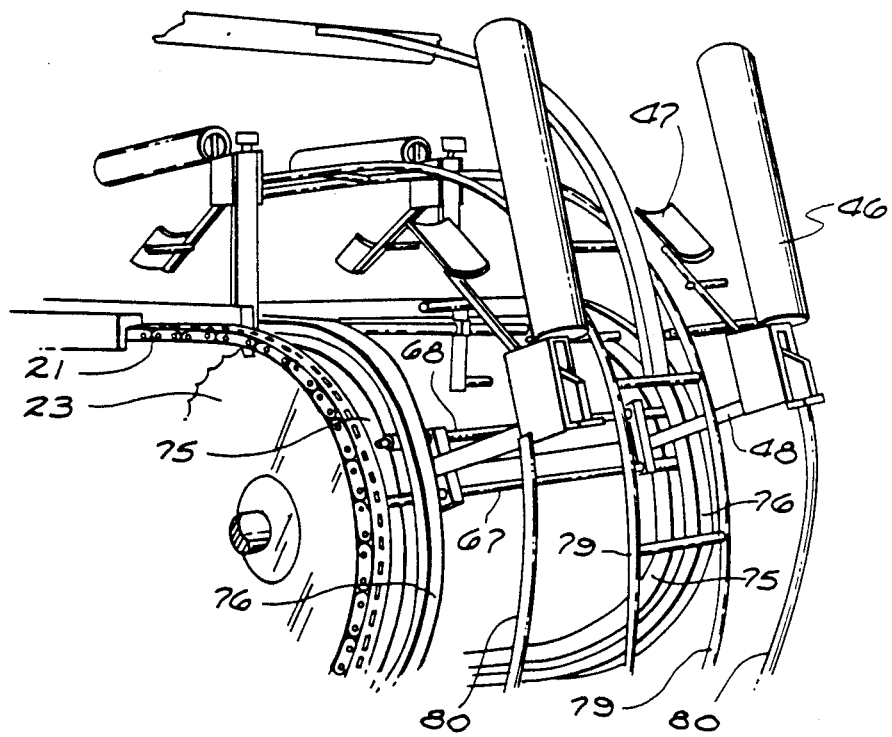
FIG. 7 is an enlarged partial view of the cooker of FIG. 1 showing carriages entering the loading position.

A food product cooker incorporating the presently preferred embodiment of the invention is illustrated in FIG. 1 and is shown diagramatically in FIG. 2. A main drive chain 21 is supported in a main frame 22 on rollers or sprockets, with rollers 23–26 being identified. Typically, the main drive chain 21 comprises two spaced endless metal link chains, driven by a motor 28 and gear box 29 mounted on the frame 22.

A pan 31 for cooking oil is supported in the lower portion of the main frame and includes a drain valve 32 at a lower corner of the pan. A mechanism is provided for raising the pan to a cooking position and lowering the pan to a maintenance position, with the pan being shown in the lowered maintenance position in FIG. 1 and in the raised cooking position in FIG. 2. The pan is raised and lowered by cables 33 wound onto a shaft 34 driven by a hand crank 35 through a gear box 36, with the shaft and gear box mounted on an upper portion of the frame 22. The food product to be fried in the oil in the pan is delivered to the machine by a conveyor belt 38 at the loading end, and the cooked product is taken away from the machine by a conveyor belt 39 at the unloading end. Typically, the incoming food product is a flat baked tortilla 40, and the outgoing product is a tubular shaped fried tortilla known as an enchilada shell 41.

Food product carriages 43 are attached to the main drive chain 21 at spaced intervals. In the embodiment illustrated, pairs of food product carriages 43 are mounted in tandem to form a carriage unit 44, as shown in FIG. 6.

The food product carriage construction is shown in greater detail in FIGS. 3-6. Each carriage includes a tubular section 46, a clamp section 47, and a support arm 48. The tubular section 46 typically is a metal sleeve open at each end and having a plurality of perforations in the wall of the tube. The clamp section 47 as illustrated comprises an arcuate plate 56 with a plurality of holes therein, with the plate carried on a clamp arm 57.

The tubular section 46 is fixed to two spaced parallel plates 49, with the clamp section 47 pivotally mounted between the plates 49 on a clamp pin 50, and with the support arm 48 pivotally mounted between the plates 49 on an arm pin 51. The tubular section 46 and clamp section 47 functions as a food product holder, in the manner to be described. In FIG. 3, the clamp and tubular sections are shown in the open condition, and the holder is shown in the first or normal position with respect to the support arm. In FIG. 4, the clamp and tubular sections are shown in the closed condition, with the holder still in the first position. In FIG. 5, the clamp and tubular sections are shown in the closed condition, with the holder now in the second or aligned position with respect to the support arm. In FIG. 6, the two carriages are shown in the closed condition and second position.

A holder cam 52 is mounted on the support arm 48 adjacent the arm pin 51, and a holder cam follower 53 is mounted on the clamp section arm 57 adjacent the clamp pin 50. The holder cam and holder cam follower are configured as follows. The upper flat portion of the cam 52 allows the clamp section 47 to be moved freely between the open and closed conditions. Also when the structure is oriented as shown in FIG. 3, with the holder sections in the open condition, the cam follower 53 engages a flat portion of the cam 52, so that the support arm 48 cannot pivot on the pin 51. When the clamp section 47 moves to the closed condition as shown in FIG. 4, the cam follower 53 clears the cam 52 and permits the arm 48 to pivot to the second position of FIG. 5. When the carriage moves from the position of FIG. 4 to the position of FIG. 5, the cam follower 53 engages the curved portion of the cam 52 and prevents pivoting of the clamp section on the pin 50, thereby maintaining the holder sections in the closed condition of FIG. 5. A first stop bar 58 is positioned between the plates 49 to serve as a stop for limiting counter-clockwise motion of the holder relative to the support arm, as shown in FIGS. 3 and 4. A second stop bar 59 is carried at the end of the arm 48 for engagement with the plates 49 to limit clockwise pivoting of the holder, as shown in FIG. 5.

Turning to FIG. 6, a slide 62 is positioned on each of the support arms 48. Typically the support arm is a steel bar of square cross section and the slide is a length of steel tubing of square cross section. A first stop pin 63 and a second stop pin 64 are carried in the support arm, spaced from each other for limiting sliding movement of the arm in the slide. Connecting bars 65 are attached to each of the slides 62, and the connecting bars are in turn joined together by a transverse bar 66. A front guide rod 67 passes through one end of each of the connecting bars, and a rear guide rod 68 passes through the other end of each of the connecting bars, preferably with rollers 69 mounted on the projecting ends of the guide rods. One of the guide rods projects further than the other, this being the guide rod 67 in the embodiment of FIG. 6, for connection to the main drive chain 21. Three rail followers are provided on each carriage, with the pin 64 serving as the support arm rail follower. A pin 71 is attached to the clamp arm 57 of the clamp section 47 to serve as the clamp section rail follower. A pin 72 is attached to one of the plates 49 of the tubular section 46 to serve as the tubular section rail follower.

An inner track 75 and an outer track 76 are provided on each side of the main frame, with the rollers 69 of the carriages riding between the inner and outer tracks supporting the carriages as they are moved around the main frame. The tracks are shown in greater detail in FIG. 7. A plurality of guide rails are mounted on the main frame for engaging the various rail followers, with rails 79-84 at the loading end and rails 87-89 at the unloading end. All of the rails are shown in the diagram of FIG. 2, and various of the rails are shown in FIGS. 7-10 and 12.

Figure 8:
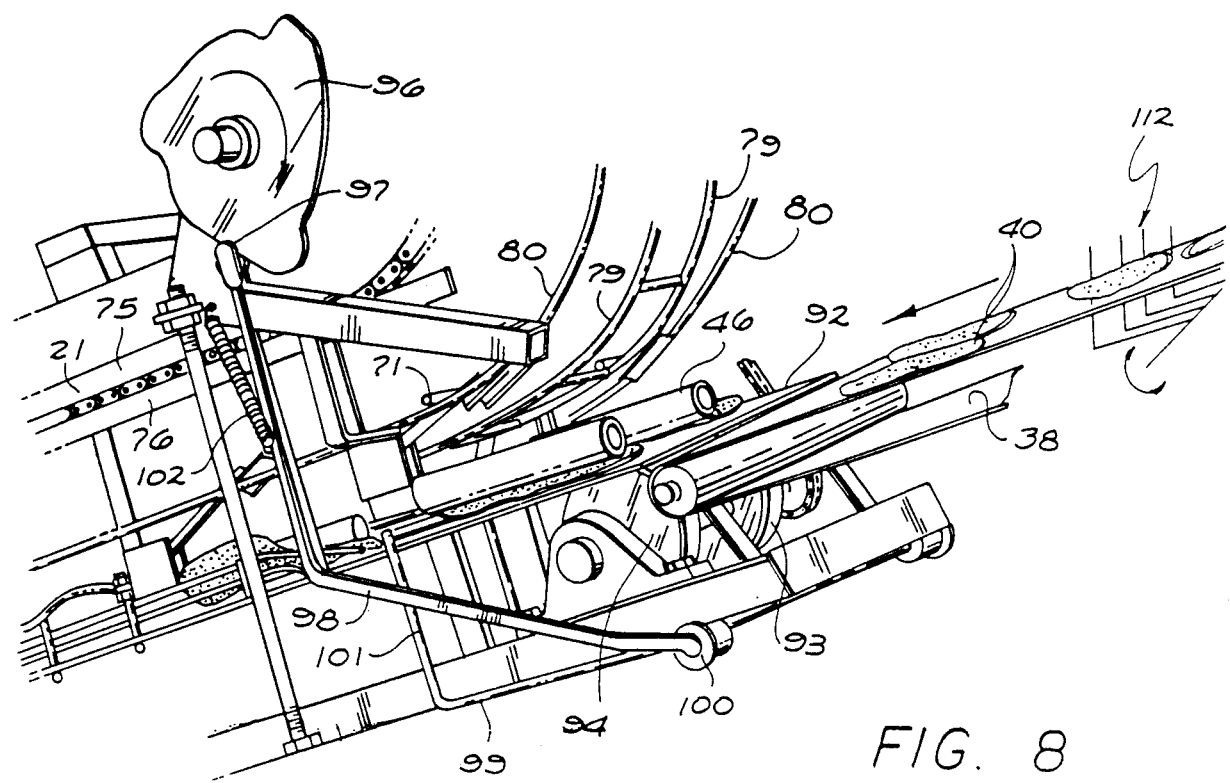
FIG. 8 is a view similar to that of FIG. 7 showing carriages further into the loading operation.

Referring to FIGS. 1 and 8, a plate 92 is mounted at the loading end of the frame for receiving the tortillas 40 from the conveyer belt 38. Another conveyer belt 93 runs on rollers 94 which are driven from the motor 28 by a conventional drive (not shown). The upper side of the belt 93 extends slightly above the upper surface of the plate 92 through a slot in the plate, as best seen in FIG. 1.

A cam 96 rotates with the roller 23, and engages a cam follower 97 carried on an arm 98. The arm 98 is connected to another arm 99 at a pivot 100, with a finger 101 at the end of the arm 99 projecting upward through an opening in the plate 92. A tension spring is mounted between the arm 98 and a portion of the main frame for urging the arm 98 upward to maintain the cam follower in contact with the cam.

A flat tortilla is positioned at the upstream end of the plate 92, and the tubular section 46 of a carriage product holder is positioned on the tortilla, in a manner to be described. The tubular section and tortilla are moved along the plate 92 by the main drive chain 21 and belt 93, and the tortilla is wrapped around the tubular section using a conventional wrapping mechanism as shown in FIGS. 9 and 10.

The wrapping mechanism includes a fixed arm 103, another fixed arm 104, a swinging arm 105, and another swinging arm 106. The swinging arms are pivotally mounted to the frame at one end of each arm, and connected to the frame by tension springs 107 at the other end of each arm. In operation, the far edge 108 of the tortilla is engaged by the fixed arm 103 and wrapped upward on the tubular section 46. Then the near edge 109 of the tortilla is engaged by the fixed arm 104 and wrapped upward on the tubular section. Next the far edge 108 is engaged by the swinging arm 105 and pushed downward on the upper side of the tubular section. Then the near edge 109 is engaged by the swinging arm 106 to complete the wrapping. Engagement of the clamp section rail follower 71 with the rail 80 has maintained the holder in the open condition, as shown in FIG. 9. As the carriage continues to move, the rail follower 71 moves downward at the end of the rail 80 and moves under the beginning of the rail 82. This action permits the clamp section to clamp the wrapped tortilla on the tubular section, and maintains the clamping pressure in the holder closed condition. The swinging arms 105, 106 are pushed aside by the holder plates 49 as the carriage moves past the arms.

In the preferred embodiment, two indexers are incorporated in the apparatus for operation in sequence to feed a tortilla to a carriage. The first indexer includes a swinging gates 112 positioned at the downstream end of the conveyor 38 for controlling dropping of tortillas onto the plate 92. An indexer mechanism 113 is positioned along the drive chain upstream of the pan 31 to provide a control signal for the operation of the gates. Typically a cam 113a is operated by the drive chain to close a microswitch 113b and provide an electric signal to the gates 112, thus releasing one pair of tortillas per pair of carriages. The gates 112 may be conventional and typically comprise first and second sets of fingers 112a, 112b which project upward through the belt 38 which is a set of belts positioned side-by-side in spaced relation. The sets of fingers 112a and 112b are pivoted downward in sequence by a motor driven cam 112c controlled by the microswitch 113b, with counterweights 112d maintaining the sets of fingers in the up position. This type of indexer mechanism is conventional with food product cookers of the type described herein. After the tortilla is deposited on the plate 92, the second indexer incorporating the cam 96 controls the tortilla position for exact engagement by the tubular section of the carriage holder.

Figure 11:
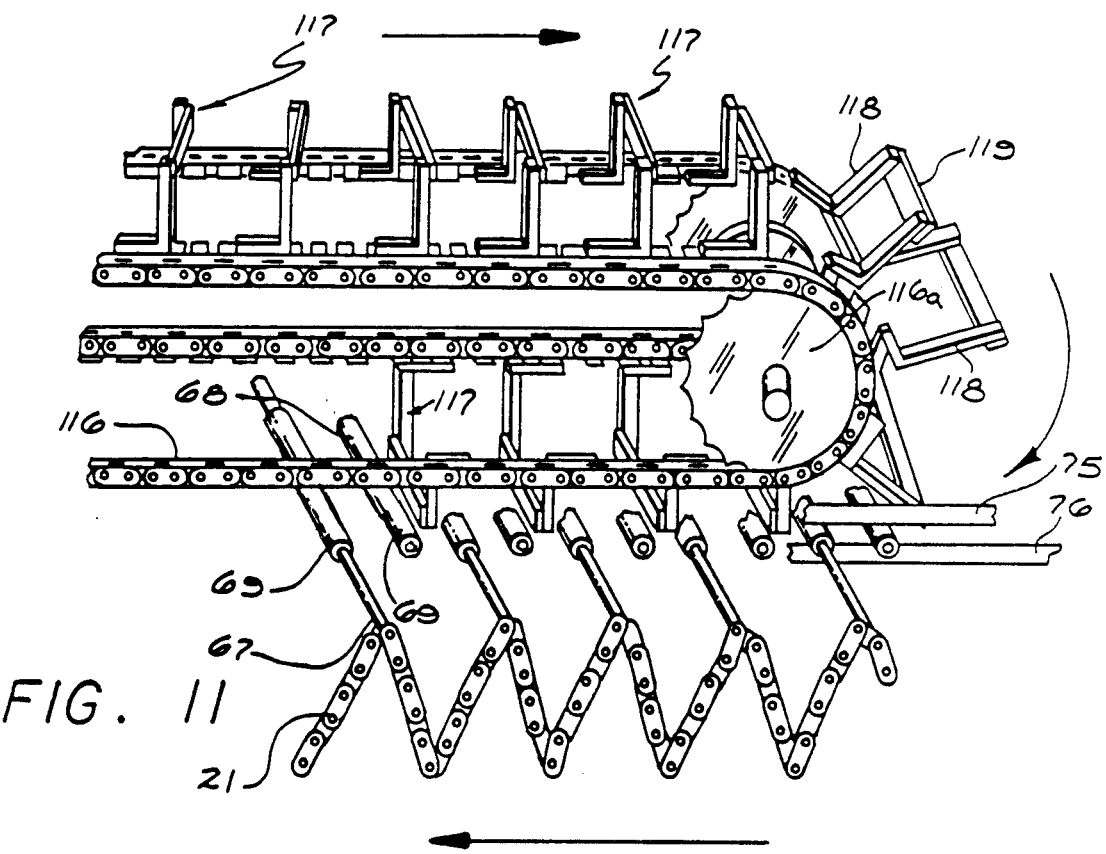
FIG. 11 is an enlarged partial sectional view of a portion of FIG. 1 illustrating the operation of the carriage drive.

The carriages 43 are moved from the exit of the pan, around the frame and back to the entrance to the pan by the main drive chain 21. A separate carriage pusher chain is utilized for moving the carriages through the cooking pan. The main drive chain 21 goes slack at the entrance to the pan so that the carriages can be positioned closer together, with the holders in the second position, and the carriages are moved through the pan by a separate carriage pusher chain 116. This arrangement is shown in detail in FIG. 11 and diagramatically in FIG. 2. Typically two spaced endless chains 116 are utilized, with the chains driven by sprockets 116a also powered from the main drive motor 28. A plurality of pusher members 117 is carried on the pusher chain 116, with the pusher members spaced apart the desired distance of spacing of the carriages 43 as they move through the cooking pan. Typically, each pusher member comprises a pair of L-shaped arms 118 with a cross bar 119 therebetween.

The main drive chain 21 is longer than the chain path around the frame and goes slack as it approaches the pan. The main drive chain is pulled around the track on the frame by the drive motor and therefore there is no tension in the chain at the pan, permitting the chain to stop at the entry to the pan. The pusher chain 116 is positioned so that the pusher members 117 will engage the carriages, typically at the rear guide rods 68, and provide the force for moving the carriages through the pan. With this arrangement, the spacing of the food product holders in the pan is determined by the spacing of the pusher members on the pusher chain, and the dwell time of the product in the pan is controlled by the speed of the pusher drive chain and the spacing of the pusher members. At the exit end of the pan, the drive chain pusher members move upward away from the carriages and the main drive chain again provides the drive force for the carriages.

Figure 12:
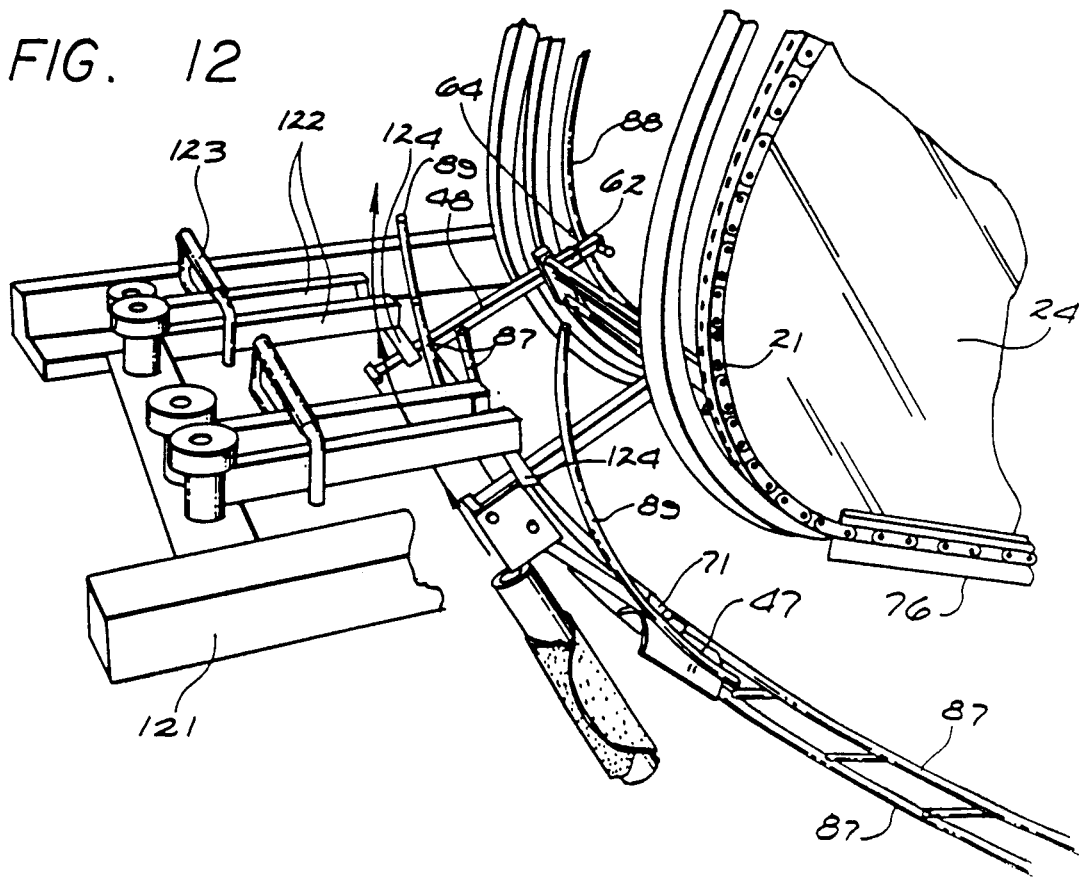
FIG. 12 is an enlarged partial sectional view of the unloading end of the cooker of FIG. 1.

The unloading section is shown in FIG. 12 and includes two pairs of stripper arms 122 pivotally mounted on the main frame. The arms of each pair are urged toward each other by a spring 123 connected to each of the arms. A deflector plate or guide finger 124 is mounted at the free end of each arm for engaging the holder plates 49 of a carriage as the carriage is moved through the unloading section. The guide fingers are dimensioned so that the stripper arms 122 are opened wide to receive the tubular section 46. When the guide fingers 124 move off the holder plates 49, the stripper arms 122 close on the tubular section 46 and engage the tortilla shell, stripping the shell from the tube as the tubular section moves between the arms. The clamp section rail follower 71 has engaged the rail 89 moving the holder to the open condition, and the carriage arm rail follower 64 has engaged the rail 88 raising the carriage to the raised or up position thereby controlling the position of the carriage with respect to the stripper arms.

The complete operation of the food cooker is shown diagramatically in FIG. 2. As the carriage 43 moves to the right along the upper portion of the frame, the tubular section rail follower 72 engages the rail 79 and the carriage is maintained in the up position. Subsequently, the clamp section rail follower 71 engages the rail 80 and maintains the clamp section 47 in the open condition. A tortilla is released from the conveyor belt 38 to the plate 92 by the indexer gate and the tortilla is moved along the plate by the belt 93. The tortilla is held in a predetermined position by the finger 101 until the finger is moved by the cam 96. Prior to the release of the tortilla by the finger, the rail 79 has terminated, and the carriage is moved to the lower position by engagement of the arm rail follower 64 with the rail 81.

After the tortilla is wrapped on the tubular section 46 as described in conjunction with FIGS. 9 and 10, the rail 80 terminates and the rail 82 begins, with the clamp section 47 being moved from the open condition to the closed condition.

After the holder sections are moved to the closed condition, the tubular section rail follower 72 engages the rail 83 maintaining the holder in the first position, as shown in FIG. 4. When the carriage is over the pan 31, the rail 83 changes shape and permits the holder to pivot downward to the second position of FIG. 5. An additional rail 84 may be provided spaced from the rail 83 for maintaining the carriage in the second position, with the tubular section rail follower 72 moving between the rails 83, 84.

Upon entering the cooking pan, the main drive chain 21 goes slack and the carriage pusher chain and pusher members move the carriage through the pan, with the carriages much closer to each other providing for the desired cooking time with a shorter cooking pan.

At the outlet end of the cooking pan, the tubular section rail follower 72 engages the rail 87 and the holder is pivoted back to the first position of FIG. 4. Then the carriage arm rail follower 64 engages the rail 88 and the carriage is raised to the up position. Finally, the clamp section rail follower 71 engages the rail 89 and the clamp section is moved to the open condition of FIG. 3. The carriage moves through the stripper arms of the unloading section, the cooked enchilada shell is stripped from the tube and drops onto the conveyor belt 39, thereby completing the cooking operation.

The design of the present invention is self-loading and eliminates any need for operator assistance. By the gathering of the chain, the nesting of the carriages and the pushing of paired carriages through the oil, a smaller size pan can be used, less oil is required, a good oil turnover is maintained, less oil breakdown occurs, and the free fatty acids are reduced. Heat transmission is uniform and adequate across the pan. The gathering of the chain and the nesting of the paired carriages also allows a compact design capable of running at increased speeds over that of earlier cookers. The ability to vertically position nested carriages results in a fried enchilada shell without excessive oiliness. The vertical positioning, the nesting of carriages, and the compactness of the design is made possible by the design for pivoting and locking the tubular section 46.

We claim:

1. In a food product cooker having a main frame, a cooking oil pan, a plurality of product carriages, and a main drive endless chain for moving said carriages about said main frame to and from said pan, with each of said carriages including a food product holder having a tubular section and a clamp section for holding a food product therebetween and a support arm having first and second ends, with said drive chain attached at said first end and with said holder attached at said second end, the improvement wherein said holder includes means for pivoting said clamp section relative to said tubular section between open and closed conditions and means for pivoting said holder between first and second positions when said holder sections are in said closed condition and means for preventing pivoting of said holder when said holder sections are in said open condition.

2. A food product cooker as defined in claim 1 wherein said holder means includes a holder cam at said support arm second end and a holder cam follower at said clamping section, with said holder cam and holder cam follower positioned in said holder for interengagement at a first location for locking said sections in said closed condition when said holder pivots away from said first position toward said second position, and with said holder cam and holder cam follower positioned in said holder for interengagement at a second location for locking said holder in said first position when said clamp section is in said open condition.

3. A food product cooker as defined in claim 2 wherein said tubular section includes a support plate with said support arm second end pivotally mounted to said plate and with said clamp section pivotally mounted to said plate, with said plate and support arm having interengaging stop means for limiting pivoting of said support arm in both directions, and with said holder cam carried at said support arm second end for pivoting with said support arm, and with said holder cam follower carried at an end of said clamp section for pivoting with said clamp section.

4. A food product cooker as defined in claim 3 wherein said carriages include a slide mounted to said support arm at said first end for sliding engagement of said slide and support arm, slide stop means for limiting movement of said support arm in both directions, and connection means carried on said slide for connecting said slide to said drive chain whereby said food product holder can slide toward and away from said drive chain.

5. A food product cooker as defined in claim 4 including means for connecting two of said carriages in parallel to said main drive chain and comprising:

first and second connecting bars, with each of said bars connected to said carriage slide with said bars having projecting first and second ends;

a transverse member connected between said connecting bars holding said carriages in spaced relation;

a first guide rod carried in said connecting bar first ends and projecting outward therefrom; and a second guide rod connected in said connecting bar second ends and projecting outward therefrom and beyond said first guide rod for fastening to said main drive chain.

6. A food product cooker as defined in claim 1 wherein said frame includes a carriage lower rail and a carriage raise rail, and each of said carriages includes carriage rail follower means for engaging said carriage rails in controlling relation for movement of a carriage between an up position and a down position relative to said main drive chain.

7. A food product cooker as defined in claim 6 wherein said carriage rail follower means includes pin means mounted on said carriage support arm adjacent said first end, and said carriage lower rail is positioned to engage a carriage rail follower means upstream of said pan and said carriage raise rail is positioned to engage a carriage rail follower means downstream of said pan.

8. A food product cooker as defined in claim 1 including means for connecting two of said carriages in parallel to said main drive chain and comprising:

first and second connecting bars, with each of said bars connected to a carriage support arm adjacent the first end thereof with said bars having projecting first and second ends;

a transverse member connected between said connecting bars holding said carriages in spaced relation;

a first guide rod carried in said connecting bar first ends and projecting outward therefrom; and a second guide rod connected in said connecting bar second ends and projecting outward therefrom and beyond said first guide rod for fastening to said main drive chain.

9. A food product cooker as defined in claim 1 wherein each of said holder sections includes a rail follower, and said frame includes product loading and unloading sections with first and second loading rails at said loading section for engaging said holder section rail followers in controlling relation.

10. A food product cooker as defined in claim 9 including:

means for delivering an uncooked, flat product onto a surface;

means for positioning said holder tubular section on the food product at said surface with said clamp section rail follower engaging said first loading rail for holding said holder section in said open condition;

means for wrapping the food product on said tubular section; and means for moving said clamp section onto said tubular section clamping the wrapped food product therebetween with said clamp section rail follower engaging said first loading rail for holding said holder sections in said closed condition.

11. A food product cooker as defined in claim 10 including means for pivoting said holder from said first position to said second position with said tubular section rail follower engaging said second loading rail for holding said holder in said first position and pivoting to said second position as said rail follower moves along said rail into said pan.

12. A food product cooker as defined in claim 10 wherein said means for positioning said holder tubular section on the food product includes a slide carried on said main drive chain with said carriage support arm sliding freely in said slide between up and down positions.

13. A food product cooker as defined in claim 10 wherein said means for delivering the food product includes:
 a support plate;
 drive means for moving the food product along said plate;
 stop means for limiting movement of the food product along said plate;
 an index cam driven by said main drive means in synchronism with said product carriages;
 an index cam follower positioned for engaging said index cam; and
 means coupling said index cam follower to said stop means for actuating said stop means.

14. A food product cooker as defined in claim 13 wherein said stop means includes at least one finger projecting upward through said plate into the path of the food product, and
 said coupling means includes a crank mounted on said main frame with one crank arm connected to said index cam follower and the other crank arm connected to said finger.

15. A food product cooker as defined in any of claims 9-14 wherein said frame includes first and second unloading rails at said unloading section for engaging said holder section rail followers in controlling relation.

16. A food product cooker as defined in claim 15 including:
 means for pivoting said holder from said second position to said first position with said tubular section rail follower engaging said first unloading rail for holding said holder in said first position;
 means for moving said clamp section away from said tubular section with said clamp section rail follower engaging said second unloading rail for holding said clamp section in said open condition;
 means for moving a cooked food product away from said main frame; and
 product stripper means having an opening for passage of said tubular section while engaging the product on said tubular section for moving the cooked product from said tubular section to said moving means.

17. A food product cooker as defined in claim 1 including:

a carriage pusher chain mounted in said main frame above said pin;
a plurality of pusher members carried on said pusher chain in spaced relation; and
support means for supporting said pusher chain above said carriages with pusher members engagable with carriages for pushing carriages through said pan.

18. In a food product cooker having a main frame, a cooking oil pan, a plurality of product carriages, and a main drive endless chain for moving said carriages about said main frame to and from said pan, with each of said carriages including a food product holder and a support arm having first and second ends, with said drive chain attached at said first end and with said holder attached at said second end,
 the improvement comprising a first indexer and a second indexer operating in sequence to feed a food product to a carriage,
 said first indexer including:
 a first conveyor for transporting a food product;
 a swinging gate positioned at the downstream end of said first conveyor for controlling dropping of the product from said first conveyor; and
 a first indexer mechanism positioned upstream of said pan to provide a control signal for the operation of said gate;
 said second indexer including:
 a product receiving surface positioned for receiving the product from said first conveyor;
 means for engaging said product holder with the food product at said surface;
 drive means for limiting movement of the product along said surface;
 an index cam driven by said main drive means in synchronism with said product carriages;
 an index cam follower positioned for engaging said index cam; and
 means coupling said index cam follower to said stop means for actuating said stop means.

19. A food product cooker as defined in claim 18 wherein said stop means includes at least one finger projecting upward through said plate into the path of the food product, and
 said coupling means includes a crank mounted on said main frame with one crank arm connected to said index cam follower and the other crank arm connected to said finger.

20. In a food product cooker having a main frame, a cooking oil pan, a plurality of product carriages, and a main drive endless chain for moving said carriages about said main frame to and from said pan, with each of said carriages including a food product holder having a tubular section and a clamp section for holding a food product therebetween and a support arm having first and second ends, with said drive chain attached at said first end and with said holder attached at said second end.
 the improvement wherein each of said holder sections includes a rail follower, and
 said frame includes product loading and unloading sections with first and second loading rails at said loading section for engaging said holder section rail followers in controlling relation, and including means for pivoting said holder from said first position to said second position with said tubular seciton rail follower engaging said second loading rail for holding said holder in said first position and pivoting to said second position as said rail follower moves along said rail into said pan, and a slide carried on said main drive chain with said carriage support arm sliding freely in said slide between up and down positions.

21. A food product cooker as defined in claim 20 wherein said frame includes first and second unloading rails at said unloading section for engaging said holder section rail followers in controlling relation, and including means for pivoting said holder from said second position to said first position with said tubular section rail follower engaging said first unloading rail for holding said holder in said first position;

means for moving said clamp section away from said tubular section with said clamp section rail follower engaging said second unloading rail for holding said clamp section in said open condition;

means for moving a cooked food product away from said main frame; and product stripper means having an opening for passage of said tubular section while engaging the product on said tubular section for moving the cooked product from said tubular section to said moving means.

* * * * *